(12) United States Patent
Ching et al.

(10) Patent No.: US 11,993,036 B2
(45) Date of Patent: May 28, 2024

(54) TIRE SEALANT COMPOSITION

(71) Applicant: ACTIVE TOOLS INTERNATIONAL (HK) LTD., Causeway Bay (CN)

(72) Inventors: Wai Kwong Ching, Causeway Bay (CN); Angeline Widjaja, Causeway Bay (CN); Koon Fung Lam, Causeway Bay (CN)

(73) Assignee: ACTIVE TOOLS INTERNATIONAL (HK) LTD., Beijing (CN)

( * ) Notice: Subject to any disclaimer, the term of this patent is extended or adjusted under 35 U.S.C. 154(b) by 586 days.

(21) Appl. No.: 17/271,696

(22) PCT Filed: Aug. 30, 2018

(86) PCT No.: PCT/CN2018/103211
§ 371 (c)(1),
(2) Date: Feb. 26, 2021

(87) PCT Pub. No.: WO2020/042075
PCT Pub. Date: Mar. 5, 2020

(65) Prior Publication Data
US 2021/0252810 A1 Aug. 19, 2021

(51) Int. Cl.
| | | |
|---|---|---|
| *C08K 3/04* | (2006.01) | |
| *B29C 73/16* | (2006.01) | |
| *C08K 3/36* | (2006.01) | |
| *C08K 5/053* | (2006.01) | |
| *C08K 5/1535* | (2006.01) | |
| *C08K 5/42* | (2006.01) | |
| *C08K 7/22* | (2006.01) | |
| *C08L 7/02* | (2006.01) | |
| *C08L 101/00* | (2006.01) | |
| *B29L 30/00* | (2006.01) | |

(52) U.S. Cl.
CPC ............. *B29C 73/163* (2013.01); *C08K 3/04* (2013.01); *C08K 3/36* (2013.01); *C08K 5/053* (2013.01); *C08K 5/1535* (2013.01); *C08K 5/42* (2013.01); *C08L 7/02* (2013.01); *C08L 101/005* (2013.01); *B29L 2030/00* (2013.01)

(58) Field of Classification Search
CPC .......... B29C 73/163; C08K 3/04; C08K 3/36; C08K 5/053; C08K 5/1535; C08K 5/05; C08K 5/10; C08K 7/22; C08L 7/02; C08L 101/005; B29L 2030/00; B29K 2105/04; B29K 2105/251
USPC .......................................................... 523/166
See application file for complete search history.

(56) References Cited

U.S. PATENT DOCUMENTS

| | | |
|---|---|---|
| 9,126,375 B2 | 9/2015 | Lam et al. |
| 2012/0141696 A1 | 6/2012 | Abad et al. |
| 2015/0152302 A1 | 6/2015 | Lam et al. |
| 2015/0166848 A1 | 6/2015 | Lam et al. |

FOREIGN PATENT DOCUMENTS

| | | |
|---|---|---|
| CN | 103333346 A | 10/2013 |
| CN | 104403109 A | 3/2015 |
| CN | 104725885 A | 6/2015 |
| EP | 1209161 A2 | 5/2002 |
| KR | 20150086934 A | 7/2015 |
| WO | WO-2017/070837 A1 | 5/2017 |
| WO | WO-2018/021239 A1 | 2/2018 |

OTHER PUBLICATIONS

Li et al., Synthesis and performance of dendrimer polyamidoamine, Chem. Res., 15(2):31-4 (2004). [Abstract only in English].
Chinese Patent Application No. 201880099276, First Office Action, dated Dec. 30, 2021.
Japanese Patent Application No. 2021-510657, Notice of Reasons for Refusal, dated May 10, 2022.
International Application No. PCT/CN2018/103211, International Search Report and Written Opinion, dated May 31, 2019.
International Application No. PCT/CN2018/103211, International Preliminary Report on Patentability, dated Jan. 11, 2021.
European Patent Application No. 18931686.2, Extended European Search Report, dated Mar. 16, 2022.

*Primary Examiner* — Hannah J Pak
(74) *Attorney, Agent, or Firm* — MARSHALL, GERSTEIN & BORUN LLP

(57) ABSTRACT

A tire sealant composition, comprising: latex emulsion, surfactant, anti-freezing agent, dendrimer, and water, and optional component(s) selected from the group consisting of wetting agent and porous particles. The tire sealant compositions are excellent in high temperature stability and/or long term stability.

9 Claims, No Drawings

TIRE SEALANT COMPOSITION

FIELD OF THE INVENTION

The present application relates to a tire sealant composition for tire repairing and more particularly, relates to tire sealant composition for repairing tire punctures.

BACKGROUND OF THE INVENTION

A tire of a vehicle may be punctured by a hard object on the road, and the punctured tire may roll unsteadily. This situation may cause a traffic accident and do physical harm to the driver of the vehicle. In order to avoid this situation, a kind of liquid sealant composition is developed. As a temporary emergent method, the liquid sealant composition can be used for repairing the punctured tire, so that the vehicle can continue to travel until reaching a repairing station.

At present, the liquid sealant composition on the market can be made according to various formulations.

Except the sealing performance, the stability of the liquid sealant composition is also important, particularly in the liquid sealant composition comprising natural latex. Surfactant can be added into the liquid sealant composition to improve the stability of the liquid sealant. In general, anionic surfactant added into the liquid sealant composition can achieve a superior stabilizing effect, but it would result in a high viscosity of the liquid sealant, especially at a low temperature.

In this aspect, WO2018021239A1 provide: provides: a tire puncture sealant having excellent injectability which contains a natural rubber latex, a synthetic resin emulsion, an antifreezing agent, a surfactant and a chelating agent, and wherein the content of the chelating agent is 0.1% by mass or more; and a tire puncture repair kit which uses this tire puncture sealant. However, currently, it is still in need of further improved stability of the sealant in such prior art.

WO2017070837A1 relates to sealant for tire repairing and more particularly, relates to sealant composition for repairing tire punctures and a method of preparing the same, where in surfactant are used to stabilize the latex. However, it is still in need of further improved stability of the sealant in such prior art.

US20150166848A1 provides a sealant composition is provided comprising latex emulsion, nanoporous particles, surfactant, anti-freezing agent, wetting agent, and water, wherein wetting agent and pH-modifier to stabilize the sealant composition. However, it is still in need of further improved stability of the sealant in such prior art.

U.S. Pat. No. 9,126,375B2 is directed to valve-through tire puncture sealant compositions including dissolved and undissolved natural bio-materials, anti-freezing agents and other rigid particles. Although these sealant compositions have several advantages: Environmentally friendly, insignificant settling, long shelf-life, etc., it is still necessary to further improved stability of the sealant in such prior art.

US20150152302A1 relates to a sealant composition, comprising 80-95 wt % liquid carrier, 0.1-10 wt % gel material derived from a water soluble polymer, 1-10 wt % latex emulsion, 0.1-5 wt % rigid particles, and 0.1-5 wt % surfactant, wherein again the surfactant is used to improve the stability and the functionality of the sealant composition. However, it is still in need of further improved stability of the sealant composition in such prior art.

Although a number of sealant composition products have been developed, when these sealant composition products are used, they may cause stability problem, especially being unstable in high temperature, such as above 70° C. and they may be unstable in a long term.

SUMMARY OF THE INVENTION

Therefore, one of the objects of the present application is to provide a tire sealant composition to improve the stability of the sealant composition in the prior art.

Another object of the present application is to provide a new stabilizing agent for the tire sealant composition.

The tire sealant composition of the present application achieves a good sealing performance for the puncture of the tire as well as excellent stability under high temperature. Furthermore, the tire sealant composition is stable in long term.

DETAILED DESCRIPTION OF THE PREFERRED EMBODIMENT

The technical solutions of the present application for solving the above identified technical problems are as follows:

A tire sealant composition, comprising: latex emulsion, surfactant, anti-freezing agent, dendrimer, and water, and optional component(s) selected from the group consisting of wetting agent and porous particles.

The sealant composition according to the preceding technical solution, wherein, the weight percentage of anti-freezing agent in the sealant composition is ranged from 20 wt % to 95 wt %, preferably 25 wt % to 94 wt %, more preferably 30 wt % to 93 wt %, most preferably 35 wt % to 92 wt %. For example, the weight percentage of anti-freezing agent in the sealant composition can be 40 wt %, 50 wt % or 90 wt %.

The sealant composition according to the preceding technical solution, wherein, the anti-freezing agent includes at least one of propylene glycol, glycerin, diethylene glycol, and 1,3-propanediol.

The sealant composition according to any one of the preceding technical solutions, wherein, the weight percentage of latex emulsion in the sealant composition is ranged from 0.01 wt % to 20 wt %, preferably 0.05 wt % to 15 wt %, more preferably 0.06 wt % to 13 wt %, most preferably 0.08 wt % to 12 wt %. For example, the weight percentage of latex emulsion in the sealant composition can be 1 wt % to 10 wt %, 1 wt % to 5 wt %, 0.1 wt %, 1 wt % or 10 wt %.

The sealant composition according to any one of the preceding technical solutions, wherein, the mass ratio of latex emulsion to surfactant in the sealant composition is from 1:5 to 3:1.

The sealant composition according to any one of the preceding technical solutions, wherein, the weight percentage of dendrimer in the sealant composition is ranged from 50 ppm to 40000 ppm, preferably from 60 ppm to 30000 ppm, more preferably from 70 ppm to 25000 ppm. For example, the weight percentage of dendrimer in the sealant composition can be 50 ppm to 40000 ppm, 100 ppm to 20000 ppm, 1000 ppm to 10000 ppm, 100 ppm, 1000 ppm, 2500 ppm, 5000 ppm, 10000 ppm or 20000 ppm. The sealant composition according to any one of the preceding technical solutions, wherein, the dendrimer includes at least one of dendrimer with succinamic acid surface, dendrimer with carboxylate sodium salt surface, and dendrimer with primary amine surface.

The sealant composition according to any one of the preceding technical solutions, wherein, the weight percentage of the surfactant in the sealant composition is ranged from 0.1 wt % to 10 wt %, preferably 0.2 wt % to 8 wt %, more preferably 0.2 wt % to 7 wt %, most preferably 0.2 wt % to 7 wt %. For example, the weight percentage of surfactant in the sealant composition can be 0.3 wt %, 1 wt %, 2 wt %, 4 wt % or 5 wt %.

The sealant composition according to any one of the preceding technical solutions, wherein, the weight percentage of wetting agent in the sealant composition is ranged from 0.001 wt % to 10 wt %, preferably 0.005 wt % to 8 wt %, more preferably 0.007 wt % to 7 wt %, most preferably 0.008 wt % to 6 wt %. For example, the weight percentage of wetting agent in the sealant composition can be 0.01 wt %, 1 wt % or 5 wt %.

The sealant composition according to any one of the preceding technical solutions, wherein, the wetting agent includes at least one of ethanol, propanol, isopropanol, ethyl butyrate and dimethyl succinate.

The sealant composition according to any one of the preceding technical solutions, wherein the porous particles include at least one of zeolite, silica aerogel, mesoporous silica, carbon aerogel, mesoporous carbon, activated carbon, cenosphere, diatomite, porous metal, and organic chelating compounds.

The sealant composition according to any one of the preceding technical solutions, wherein, the weight percentage of porous particles in the sealant composition is ranged from 0.001 wt % to 10 wt %, preferably 0.005 wt % to 8 wt %, more preferably 0.007 wt % to 7 wt %, most preferably 0.008 wt % to 6 wt %. For example, the weight percentage of porous particles in the sealant composition can be 0.01 wt % to 5 wt %, 0.01 wt % to 2 wt %, 0.1 wt % to 2 wt %, 0.5 wt % to 1.5 wt %, 0.01 wt %, 1 wt % or 5 wt %.

The sealant composition according to any one of the preceding technical solutions, wherein, the sealant composition further comprises anti-freezing additive, and the anti-freezing additive includes inorganic salts and/or organic salts.

The sealant composition according to any one of the preceding technical solutions, wherein, the sealant composition further comprises assisted additive, and the assisted additive includes at least one of anti-corrosion additive, insecticide, pH-modifier, anti-foaming agent, preservative, colorant, and odorant.

The technical solution according to the present invention may include the use of dendrimer as a stabilizer for a sealant composition or the sealant composition according to any one of the preceding technical solutions.

The technical solution according to the present invention may further include a stabilizer for a sealant composition comprising a dendrimer as defined in the context of the present application.

In the context of the present application, the weight percentage of water in the sealant composition is ranged from 0.01 wt % to 90 wt %, preferably 0.1 wt % to 80 wt %, more preferably 1 wt % to 70 wt %, most preferably 1.2 wt % to 55 wt %. For example, the weight percentage of water in the sealant composition can be 1.5 wt %, 32.5 wt %, 37.5 wt %, 40 wt %, 41 wt %, 41.5 wt %, 41.9 wt %, 42 wt %, 42.4 wt %, 42.5 wt %, 44.5 wt %, 45.5 wt %, 46.2 wt % or 51.5 wt %.

In the context of the present application, the dendrimers can be ethylenediamine-core (EDA-core) polyamidoamine dendrimers with different series of generations and different surface functional groups. The polyamidoamine dendrimers can be at least one of EDA-core G2 with succinamic acid surface, EDA-core G2 with primary amine surface, and EDA-core G0.5 with carboxylate sodium salt surface. The sealant composition can include composite dendrimers by mixing different kinds of dendrimer together. The composite dendrimers can be a mixture of different kinds of surface functional groups.

In the present application, the weight percentage of the dendrimers in the sealant composition may range from 50 ppm to 40000 ppm, preferably from 60 ppm to 30000 ppm, more preferably from 70 ppm to 25000 ppm. For example, the weight percentage of dendrimer in the sealant composition can be 100 ppm, 1000 ppm, 2500 ppm, 5000 ppm, 10000 ppm or 20000 ppm. In the context of the present application, the surfactant can be anionic surfactant and/or non-ionic surfactant. The non-ionic surfactant can be at least one of polyoxyethylene sorbitan monostearate, polyoxyalkylene alkyl ether, polyoxyalkylene alkenyl ether, polyoxyethylene alkylamine, and triethanolamine laurate. The anionic surfactant can be sodium dodecyl sulfate (SDS). Although SDS may increase the viscosity of the sealant composition, it can stabilize the latex emulsion in the sealant composition effectively.

The sealant composition can include composite surfactant formed by mixing different kinds of surfactant together, wherein the kinds of the surfactant for forming the composite surfactant can be selected according to the kind and the amount of the latex emulsion used in the sealant composition. The composite surfactant can be a mixture of different kinds of non-ionic surfactant, a mixture of at least one kind of non-ionic surfactant and at least one kind of anionic surfactant, or a mixture of different kinds of anionic surfactant.

Furthermore, the sealant composition further comprises the wetting agent (e.g., alcohol, ether, or ester) used to improve the wettability, viscosity, and spreading property of the sealant composition. The wetting agent is used to decrease the surface tension of the sealant composition, so that the sealant composition can spread to an end surface area of a tire more easily. Thus, the sealant composition can effectively seal a puncture out of a tread area of a tire.

In the present application, the wetting agent can be ethanol, propanol, isopropanol, ethyl butyrate, dimethyl succinate, or other chemical materials, etc. These wetting agents have low surface tension, so that the surface tension of the sealant composition can be effectively reduced when these wetting agents are added into the sealant composition. In the present application, the weight percentage of the wetting agent in the sealant composition is ranged from the 0.01% to 5%. It is evident that the wetting agent decreases the contact angle of the sealant composition. Meanwhile, the wetting agent can enhance the anti-freezing effect and stabilizing effect of the sealant composition.

In the context of the present application, it is understood that the unit "ppm" is based on the mass (weight) and it is convertible with "wt %" based on a conversion factor that 1 wt %=10000 ppm.

EXAMPLES

The present invention is illustrated in reference to the following examples.

<Preparation of Sealant Composition>

The sealant composition according to the present invention including the following examples is prepared by mixing two parts together. The first part, Part A, contains water/ solvent, surfactant, nanoporous particles, anti-freezing agents, wetting agents, and dendrimers.

The second part, Part B, contains water/solvent and latex.

In typical preparation, Part A is added into Part B. The pH of the final composition is adjusted to above 8.5 by addition of alkaline including but not limited to NaOH, KOH, ammonia, and tetramethylammonium hydroxide.

<Evaluation>

The sealant composition performance is tested by injecting 300 ml of the prepared sealant composition into a 195/65 R15 aged tires through a hose under high pressure, preferably 3-7 bar. A spike with a length that is less than 8 mm is also used to form a puncture formed on a tire. The vehicle with the tire is then driven to run for less than 20 km. every time when the vehicle runs for 2-5 km, the air leakage of the tire is checked by measuring the inner tire pressure. In this way, the sealing effect on the tire puncture, which is caused by the sealant composition, can be recorded by the aforementioned method. If the decrement of the inner tire pressure is less than 0.2 bar, it is indicated that the sealant composition seals the tire puncture successfully, that is, the sealing performance of the sealant composition is good. After the tire is detached from the vehicle, the tire is kept being stationary, with the tire puncture facing upwards. The pressure decrement can be measured again after 24-hour or 48-hour to confirm the sealing performance.

The shelf life of the sealant composition can be tested by static aging test and heat dynamic test. In the static aging test, the sealant composition is placed in an oven at a temperature of 70° C. or more for more than 40 days, and thus the sealing performance for can be evaluated as described above.

The test results of the Examples according to the present invention are provided in the following Table 1.

Examples of sealant composition prepared and their evaluation result are shown as follows.

Example 1

The sealant composition comprises: 42.4 wt % water, 1 wt % sodium dodecyl sulfate, 4 wt % polyoxyethylene sorbitan monostearate, 1 wt % silica aerogel, 5000 ppm EDA-core G2 polyamidoamine dendrimer with succinamic acid surface, 50 wt % glycerin, 1 wt % n-propanol, and 0.1 wt % natural latex.

Example 2

The sealant composition comprises: 32.5 wt % water, 1 wt % sodium dodecyl sulfate, 4 wt % polyoxyethylene sorbitan monostearate, 1 wt % silica aerogel, 5000 ppm EDA-core G2 polyamidoamine dendrimer with succinamic acid surface, 50 wt % glycerin, 1 wt % n-propanol, and 10 wt % natural latex.

Example 3

The sealant composition comprises: 41.5 wt % water, 5 wt % polyoxyethylene lauryl ether, 1 wt % mesoporous silica, 5000 ppm EDA-core G2 polyamidoamine dendrimer with carboxylate sodium salt surface, 50 wt % diethylene glycol, 1 wt % ethanol, and 1 wt % natural latex.

Example 4

The sealant composition comprises: 46.2 wt % water, 0.3 wt % polyoxyethylene lauryl ether, 1 wt % mesoporous silica, 5000 ppm EDA-core G2 polyamidoamine dendrimer with carboxylate sodium salt surface, 50 wt % diethylene glycol, 1 wt % ethanol, and 1 wt % natural latex.

Example 5

The sealant composition comprises: 51.5 wt % water, 5 wt % polyoxyethylene sorbitan monostearate, 1 wt % carbon aerogel, 5000 ppm EDA-core G2 polyamidoamine dendrimer with primary amine surface, 40 wt % propylene glycol, 1 wt % isopropanol, and 1 wt % natural latex.

Example 6

The sealant composition comprises: 1.5 wt % water, 5 wt % polyoxyethylene sorbitan monostearate, 1 wt % carbon aerogel, 5000 ppm EDA-core G2 polyamidoamine dendrimer with primary amine surface, 90 wt % propylene glycol, 1 wt % isopropanol, and 1 wt % natural latex.

Example 7 (No Wetting Agent)

The sealant composition comprises: 42.5 wt % water, 5 wt % polyoxyalkylene alkenyl ether, 1 wt % mesoporous carbon, 5000 ppm EDA-core G2 polyamidoamine dendrimer with succinamic acid surface, 50 wt % 1,3-propanediol, and 1 wt % natural latex.

Example 8

The sealant composition comprises: 42.5 wt % water, 5 wt % polyoxyethylene sorbitan monostearate, 1 wt % mesoporous carbon, 5000 ppm EDA-core G2 polyamidoamine dendrimer with succinamic acid surface, 50 wt % 1,3-propanediol, 0.01 wt % n-propanol, and 1 wt % natural latex.

Example 9

The sealant composition comprises: 37.5 wt % water, 5 wt % polyoxyethylene sorbitan monostearate, 1 wt % mesoporous carbon, 5000 ppm EDA-core G2 polyamidoamine dendrimer with succinamic acid surface, 50 wt % 1,3-propanediol, 5 wt % n-propanol, and 1 wt % natural latex.

Example 10 (No Nanoporous Particles)

The sealant composition comprises: 42.5 wt % water, 5 wt % polyoxyethylene alkylamine, 5000 ppm EDA-core G2 polyamidoamine dendrimer with carboxylate sodium salt surface, 50 wt % propylene glycol, 1 wt % ethanol, and 1 wt % natural latex.

Example 11

The sealant composition comprises: 42.5 wt % water, 5 wt % polyoxyethylene sorbitan monostearate, 0.01 wt % silica aerogel, 5000 ppm EDA-core G2 polyamidoamine dendrimer with carboxylate sodium salt surface, 50 wt % propylene glycol, 1 wt % ethanol, and 1 wt % natural latex.

Example 12

The sealant composition comprises: 37.5 wt % water, 5 wt % polyoxyethylene sorbitan monostearate, 5 wt % silica aerogel, 5000 ppm EDA-core G2 polyamidoamine dendrimer with carboxylate sodium salt surface, 50 wt % propylene glycol, 1 wt % ethanol, and 1 wt % natural latex.

Example 13 (No Nanoporous Particles and Wetting Agent)

The sealant composition comprises: 43.5 wt % water, 5 wt % polyoxyethylene sorbitan monostearate, 5000 ppm EDA-core G2 polyamidoamine dendrimer with primary amine surface, 50 wt % propylene glycol, and 1 wt % natural latex.

Example 14

The sealant composition comprises: 42 wt % water, 5 wt % polyoxyethylene cocoalkyl amine, 1 wt % activated carbon, 100 ppm EDA-core G2 polyamidoamine dendrimer with succinamic acid surface, 50 wt % propylene glycol, 1 wt % isopropanol, and 1 wt % natural latex.

Example 15

The sealant composition comprises: 41.9 wt % water, 5 wt % polyoxyethylene sorbitan monostearate, 1 wt % activated carbon, 1000 ppm EDA-core G2 polyamidoamine dendrimer with succinamic acid surface, 50 wt % propylene glycol, 1 wt % isopropanol, and 1 wt % natural latex.

Example 16

The sealant composition comprises: 41.5 wt % water, 5 wt % polyoxyethylene sorbitan monostearate, 1 wt % silica aerogel, 5000 ppm EDA-core G2 polyamidoamine dendrimer with succinamic acid surface, 50 wt % propylene glycol, 1 wt % isopropanol, and 1 wt % natural latex.

Example 17

The sealant composition comprises: 41 wt % water, 5 wt % triethanolamine laurate, 1 wt % silica aerogel, 10000 ppm EDA-core G2 polyamidoamine dendrimer with succinamic acid surface, 50 wt % propylene glycol, 1 wt % isopropanol, and 1 wt % natural latex.

Example 18

The sealant composition comprises: 40 wt % water, 5 wt % triethanolamine laurate, 1 wt % cenosphere, 20000 ppm EDA-core G2 polyamidoamine dendrimer with succinamic acid surface, 50 wt % propylene glycol, 1 wt % isopropanol, and 1 wt % natural latex.

Example 19 (Comparative: No Dendrimer, Nanoporous Particles, and Wetting Agent)

The sealant composition comprises: 44 wt % water, 5 wt % polyoxyethylene sorbitan monostearate, 50 wt % propylene glycol, and 1 wt % natural latex.

Example 20

The sealant composition comprises: 41.5 wt % water, 5 wt % polyoxyethylene sorbitan monostearate, 1 wt % silica aerogel, 2500 ppm EDA-core G2 polyamidoamine dendrimer with succinamic acid surface, 2500 ppm EDA-core G2 polyamidoamine dendrimer with carboxylate sodium salt surface, 50 wt % propylene glycol, 1 wt % isopropanol, and 1 wt % natural latex.

Example 21

The sealant composition comprises: 42.5 wt % water, 4 wt % polyoxyethylene sorbitan monostearate, 1 wt % silica aerogel, 5000 ppm EDA-core G2 polyamidoamine dendrimer with succinamic acid surface, 50 wt % propylene glycol, 1 wt % isopropanol, and 1 wt % natural latex.

Example 22

The sealant composition comprises: 44.5 wt % water, 2 wt % polyoxyethylene sorbitan monostearate, 1 wt % silica aerogel, 5000 ppm EDA-core G2 polyamidoamine dendrimer with succinamic acid surface, 50 wt % propylene glycol, 1 wt % isopropanol, and 1 wt % natural latex.

Example 23

The sealant composition comprises: 45.5 wt % water, 1 wt % polyoxyethylene sorbitan monostearate, 1 wt % silica aerogel, 5000 ppm EDA-core G2 polyamidoamine dendrimer with succinamic acid surface, 50 wt % propylene glycol, 1 wt % isopropanol, and 1 wt % natural latex.

TABLE 1

Evaluation Result

| Example | Sealing Result* |
|---|---|
| 1 | ○ |
| 2 | ◉ |
| 3 | ◉ |
| 4 | ○ |
| 5 | ◉ |
| 6 | ◉ |
| 7 | ◉ |
| 8 | ◉ |
| 9 | ● |
| 10 | ◉ |
| 11 | ◉ |
| 12 | ◉ |
| 13 | ○ |
| 14 | ◉ |
| 15 | ● |
| 16 | ● |
| 17 | ● |
| 18 | ◉ |
| 19 | Δ |
| 20 | ● |
| 21 | ● |
| 22 | ● |
| 23 | ○ |

| *Symbol | Average sealing performance in 3 tests during high temperature test at 70° C. |
|---|---|
| ● | Seal at 1st/2nd run in average |
| ◉ | Seal at 2nd/3rd run in average |
| ○ | Seal at 3rd/4th run in average |
| Δ | Seal at 4th/5th run in average |

According to the results shown in Table 1, the sealing performance under high temperature of the sealant composition in Example 19 (comparative) containing no dendrimer was poor.

In contrast, the sealing performance under high temperature of the sealant composition in Examples 1-18 and 20 having the dendrimer according to the present invention was better than said Example 19 (comparative). This result clearly proves that the dendrimer according to the present invention is able to improve the stability of the sealant composition in the prior art and proves that it can be used a stabilizing agent for the sealant composition, such that the sealant composition of the present application can achieve a good sealing performance for the puncture of the tire as well as excellent stability under high temperature. In addition, the results in the Examples also clearly prove that the dendrimer according to the present invention can be used as stabilizing agent for the sealant composition.

Furthermore, by comparing Example 16 with Examples 21-22, it is found by the Inventor that the use of the dendrimer is able to reduce the amount of surfactant used without adverse effect to the sealing performance of the sealant composition under high temperature. It is noted that the amount of the surfactants in the sealant composition of the present invention can be reduced to 1 wt %, 2 wt %, or 4 wt %, such that the amount of the surfactants can be maintained as minimum as possible but sealing performance of the sealant composition under high temperature is still maintain. This is a further evidence that the dendrimer can be used as stabilizer to stabilize the sealant composition and that the dendrimer can replace in part the surfactants in the sealant composition of the present invention. Accordingly, the use of dendrimer in place of surfactant in part is able to at least partially address the issue of high viscosity of the liquid sealant caused by adding surfactant, such as anionic surfactant, especially at a low temperature, since less amount of surfactant is necessary in the sealant composition of the present invention.

Above all, the sealant composition of the present application achieves a good sealing performance for the puncture of the tire. Furthermore, the sealant composition is further stable in long term, is easy to use and non-perishable, and has a long shelf life, which endows the sealant composition with a good market prospect.

The present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

The invention claimed is:

1. A tire sealant composition, comprising: latex emulsion, surfactant, anti-freezing agent, dendrimer, and water, and optional component(s) selected from the group consisting of wetting agent and porous particles, wherein the weight percentage of anti-freezing agent in the sealant composition is ranged from 20 wt % to 95 wt %;

wherein the weight percentage of latex emulsion in the sealant composition is ranged from 0.01 wt % to 20 wt %;

wherein the weight percentage of dendrimer in the sealant composition is ranged from 50 ppm to 40000 ppm;

wherein the weight percentage of the surfactant in the sealant composition is ranged from 0.1 wt % to 10 wt. %; and wherein the dendrimer includes dendrimer with succinamic acid surface, dendrimer with carboxylate sodium salt surface, dendrimer with primary amine surface, or a combination thereof.

2. The sealant composition according to claim 1, wherein, the anti-freezing agent includes propylene glycol, glycerin, diethylene glycol, 1,3-propanediol, or a combination thereof.

3. The sealant composition according to claim 1, wherein, the mass ratio of latex emulsion to surfactant in the sealant composition is from 1:5 to 3:1.

4. The sealant composition according to claim 1, wherein, the weight percentage of wetting agent in the sealant composition is ranged from 0.001 wt % to 10 wt %.

5. The sealant composition according to claim 1, wherein, the wetting agent includes ethanol, propanol, isopropanol, ethyl butyrate, dimethyl succinate, or a combination thereof.

6. The sealant composition according to claim 1, wherein the porous particles include zeolite, silica aerogel, mesoporous silica, carbon aerogel, mesoporous carbon, activated carbon, cenosphere, diatomite, porous metal, organic chelating compounds, or a combination thereof.

7. The sealant composition according to claim 1, wherein, the weight percentage of porous particles in the sealant composition is ranged from 0.001 wt % to 10 wt %.

8. The sealant composition according to claim 1, wherein, the sealant composition further comprises anti-freezing additive, and the anti-freezing additive includes inorganic salts and/or organic salts.

9. The sealant composition according to claim 1, wherein, the sealant composition further comprises assisted additive, and the assisted additive includes anti-corrosion additive, insecticide, pH-modifier, anti-foaming agent, preservative, colorant, odorant, or a combination thereof.

* * * * *